Patented May 14, 1940

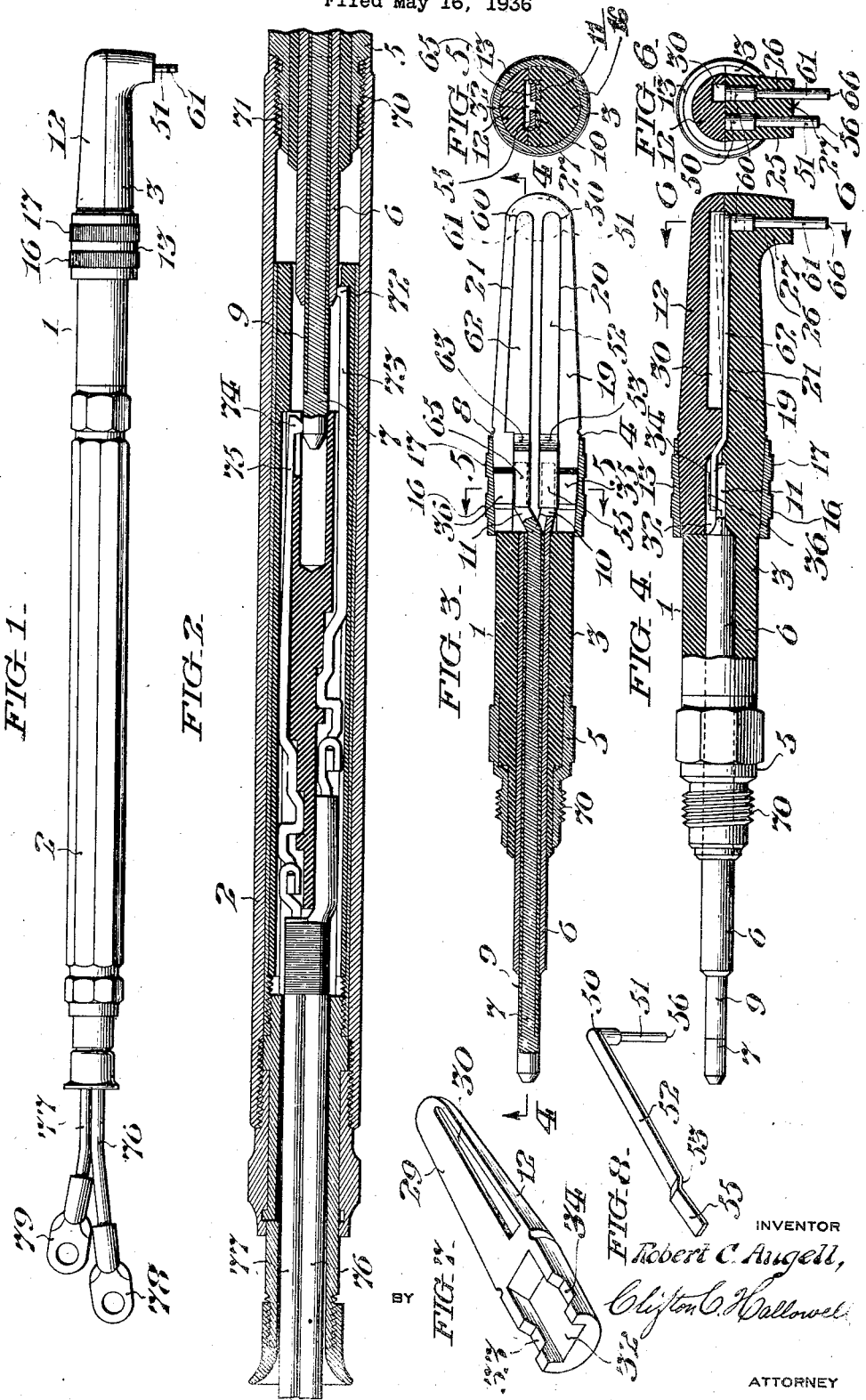
May 14, 1940.  R. C. ANGELL  2,200,321
PULP TESTER
Filed May 16, 1936

2,200,321

UNITED STATES PATENT OFFICE 2,200,321

PULP TESTER

Robert C. Angell, Prince Bay, N. Y., assignor to The S. S. White Dental Manufacturing Company, a corporation of Pennsylvania Application May 16, 1936, Serial No. 80,133

10 Claims. (Cl. 128—2.1)

This invention relates particularly to that class of implements that are employed by dental practitioners in determining the condition of the pulp of a tooth by means of an electric circuit, and is especially directed to the type that comprises two relatively spaced electrodes that may be brought into intimate contact with the tooth to be tested.

Pulp testers that have been commonly used are of two distinct types, one having a single point electrode and the other having double point electrodes, the former having one terminal of a metallic circuit arranged to be brought into contact with the patient's tooth, while the other terminal is held in the patient's hand so that when an electric current is turned on, the body of the patient, including the tooth, completes the circuit, and the latter having relatively spaced electrodes providing closely related terminals for a metallic circuit which may be completed by bringing said spaced electrodes into contact with a tooth to be tested. The vitality is judged in the two point tested in substantially the same manner as with the single point tester, excepting that the voltage required to produce like sensation is considerably greater.

The double point tester has advantages over the single point tester in that the patient is not required to give attention to the apparatus as is the case where an electrode is required to be held in the patient's hand. Furthermore, there is a minimum probability of error in the double point tester for the reason that the electric current is localized to the vicinity of the two electrode points in contact with the tooth under test, whereas, in a single point tester there is possibility of obtaining false sensation in a devitalized tooth by reason of the current passing through the patient's body.

The principal object of my invention is to provide a double point pulp tester that will be self-seating and consequently afford a satisfactory and reliable contact of both of the electrode points irrespective of the contour of the surface of the tooth engaged to be tested.

Other objects of my invention are to provide a pulp tester that is so constructed and arranged as to be readily taken apart and assembled, to not only inspect and replace defective or broken parts but also to afford thorough cleansing and sterilization.

Further objects of my invention are to provide a pulp tester having electrode points that have their respective tooth engaging ends normally extended to different distances from the instrument body in which they are held, one being rigidly held by said body while the other is yieldingly engaged therein, and axially movable in parallel relation with respect to the one rigidly held.

My invention also comprehends a pulp tester having readily separated and easily assembled parts comprising that portion of the instrument that is adapted to be entered into the mouth of the patient, so as to be conveniently cleansed and sterilized after its use on each individual patient.

Specifically stated, the form of my invention as hereinafter described comprises an implement arranged to be readily connected and disconnected with an electric current conductor carrying handle, and having electrical conveyors with which tooth engaging electrodes are normally held in contact by a removable and replaceable cover portion of the implement body.

My invention also includes all of the various novel features of construction and arrangement as hereinafter more definitely specified.

In the accompanying drawing, Figure 1 is a side elevational view of a pulp tester operatively connected with an electrical conductor carrying instrument handle; Fig. 2 is a vertical longitudinal sectional view of said instrument handle and a fragment of the rear end of said pulp tester, taken along the axis thereof, and conveniently showing the electrical connections; Fig. 3 is a horizontal longitudinal sectional view of the pulp tester per se; Fig. 4 is a vertical longitudinal sectional view of said pulp tester, the rear portion thereof being shown in elevation for convenience of illustration; Fig. 5 is a transverse vertical sectional view of the pulp tester taken on the line 5—5 in Fig. 3; Fig. 6 is a transverse sectional view of the pulp tester taken on the line 6—6 in Fig. 4, the electrodes being shown in elevation for convenience of illustration; Fig. 7 is an inverted perspective view of the removable and replaceable cover for the electrode units; and Fig. 8 is a perspective view of the rigidly held electrode unit.

In said figures, the pulp tester 1 is shown removably engaged with the instrument handle 2 which is so constructed and arranged as to be interchangeably engaged with other electrical instruments employed for different purposes, and which is described in detail in my prior Patent No. 1,968,867.

The pulp tester 1 comprises the body 3 preferably formed of molded material and having joined therewith the threaded ferrule 5 by which it may be conveniently attached to the handle 2, and also having therein the electrical conductors 6 and 7 that are insulated from each other by the insulation sleeve 9, the forward ends of said conductors 6 and 7 terminate within the body 3 in the form of flattened contacts 10 and 11.

The forward portion of the pulp tester body 3 is divided on a horizontal plane preferably coincident with its axis so that its upper forward portion is removable and replaceable and serves as a cap 12 which is normally retained in complementary relation with the body 3 proper by the annular retainer ferrule 13 whose inner tapered surface conforms to the slightly tapering surfaces 4 and 8 of the intermediate region of the body 3 and the rear end region of the outer surface of said cap or cover 12 respectively, and whose outer surface is provided with the knurled bands 16 and 17 conveniently serving to facilitate its adjustment in locking or unlocking the cap 12 with respect to the body 3.

The plane surface 19 of the body 3 is provided with longitudinally disposed parallel pockets 20 and 21 which respectively communicate with the relatively parallel bores 25 and 26 extended through the downwardly extending snout-like projection 27.

As shown in Fig. 3, the pocket 20 is of uniform width throughout its extent, while the pocket 21 gradually increases in width rearwardly for a portion of its length, and, as shown in Fig. 7, the cap 12 is provided in its plane surface 29 with a pocket 30 conforming to the gradually increasing width portion of the pocket 21 and registrable therewith to provide a cavity of relatively substantial depth, as shown in Figs. 4 and 6.

Said cap, as shown in Figs. 4, 5 and 7, is also provided at its rear end portion with the substantially rectangular pocket 32 in its plane surface 29, the side walls of which pocket are provided with recesses 33 and 34 arranged to conform to correspondingly formed projections 35 and 36 rising from the plane surface of said body 3, as indicated in Figs. 3, 4 and 5, so that when these recesses and projections relatively engage and the retaining ferrule is forced to place, the cap 12 is held in integral relation with the body 3 proper.

The pocket 20 and its communicating bore 25 is arranged to receive the electrode 50, shown in Figs. 3, 5, 6 and 8, having its terminal 51 extended through the bore 25 and its spring tail-piece or tang 52 extending rearwardly and offset at 53 and terminating in the contact 55, which is slightly declined rearwardly, as shown in Fig. 8, so as to insure a maximum pressure contact with the flattened contact terminal 10, as shown in Figs. 3 and 5.

The pocket 21 and its communicating bore 26 is arranged to receive the electrode 60 and its parts, shown in Figs. 3, 4, 5 and 6, having its terminal 61 extended through the bore 26 and its spring tail-piece 62 extending rearwardly and offset at 63 and terminating in the contact 65, and like the contact 55 is arranged to be slightly declined rearwardly so as to insure pressure contact with the flattened contact terminal 11. It may be here noted that the tail-piece 62 gradually increases in width rearwardly for a portion of its length and conforms to the pocket 21, and that the difference in shape of the spring tail-pieces of the respective electrodes insures their proper placement.

It will be observed that the electrode terminal 61 is somewhat longer than the electrode terminal 51, and that the tail-piece 52 of the electrode 50 is held by the cap 12 in stationary relation, while the electrode tail-piece 62 of the electrode 60 is free to rise in the pocket 30 in the cap 12 so that when the point 66 of the terminal 61 engages the surface of a tooth it yields upwardly with respect to the structure as shown in Figs. 4 and 6 until the point 56 of the terminal 51 also engages a surface of the tooth or other object under observation.

As shown in Figs. 2, 3 and 4, the ferrule 5 is provided with screw threads 70 arranged to engage the internal screw threads 71 in the forward end of the instrument handle 2 so that when thus engaged the conductors 6 and 7 respectively contact with the contact points 72 and 74 of the respective spring tangs 73 and 75, which are connected through the leads 76 and 77 with the terminal connectors 78 and 79.

My invention is advantageous in that it provides a mouth instrument having its parts so correlated as to be conveniently separated for cleansing and sterilizing purposes, and also affords convenient replacement of worn, broken or defective parts; furthermore, it may be readily connected and disconnected with an instrument handle universally employed to receive and hold instruments variously constructed to perform widely differing functions.

I do not desire to limit my invention to the precise details of construction and arrangement as herein set forth, as it is obvious that various modifications may be made therein without departing from the essential features of my invention as defined in the appended claims.

Having thus described my invention, I claim:

1. A dental pulp tester having relatively movable electrode points normally projecting outwardly in the same general direction from the free end of said implement to relatively different extent and arranged to be relatively moved so that the relative difference in extent of projection may be varied.

2. A dental pulp tester comprising a hollow split body having a removable and replaceable cover, electrodes having terminal connecting tail pieces removably retained in the hollow of said body by said cover, one electrode being held stationary while the other may be relatively moved with respect thereto by contact with a tooth surface.

3. An implement of the class described comprising a split body provided with pockets and having a removable and replaceable cover, electric conductors in said body, electrodes disposed in said pockets and having inclined contacts arranged to be pressed into engagement with said conductor by said cover.

4. An implement of the class described comprising a body having separable parts which when assembled afford pockets, means engaging said parts to form an integral structure electric conductors terminating in said body, and removable and replaceable electrode tangs disposed in said pockets and held in electrical contact within said body with said electric conductors by said means.

5. An implement of the class described comprising a body having relatively separable parts which when assembled afford pockets of relatively different depth, electric conductors in said body, and removable and replaceable electrode tangs disposed in said pockets in electrical contact with said electric conductors, one being maintained rigid with said body and the other being free to move by lateral deflection with respect thereto in the pocket of greater depth.

6. An implement of the class described comprising a body having relatively separable parts and including a cover which when assembled afford pockets of different depths and contours, a locking member slidably mounted thereon and arranged to rigidly hold said body and cover in integral relation, electric conductors in said body, and removable and replaceable electrode tangs of contours corresponding substantially to the contours of said pockets disposed in said pockets in electrical contact with said electric conductors, one being maintained rigid with said body and the other being free to move by lateral deflection with respect thereto in the pocket of greater depth.

7. An implement of the class described comprising a body having relatively separable parts including a cover cooperative to form pockets of relatively different contour and extent, electric conductors having their inner ends terminating in one of said pockets, an electrode part of substantially uniform width removably disposed in another of said pockets and having a rearwardly extending contact projecting into engagement with the terminal of one of said conductors and an electrode part of varying width removably disposed in another of said pockets and having a rearwardly extending contact projecting into engagement with the terminal of the other of said conductors.

8. An implement of the class described comprising a body having an electric conductor terminating therein, and provided with a pocket, and an electrode disposed in said pocket and comprising a tang terminating in a flexible contact arranged to engage said conductor and normally disposed in angular relation to said tang and arranged to be deflected by engagement with said body.

9. An implement of the class described comprising a body having relative separable parts including a cover, the body proper and said cover being cooperative to form pockets therein, electrical conductors terminating in said pockets, an electrode held immovable in said body by said cover and comprising a tang having a terminal projecting laterally therefrom through the side of said body, a movable electrode having a tang deflectable in one of said pockets and having a terminal projecting laterally therefrom through the side of said body in parallel relation to the terminal of said immovable electrode and normally projecting outwardly beyond the end thereof and arranged to be forced inwardly against the spring tension of its tang by bearing against a conducting object until the points of both electrode terminals engage said object whereby a closed electrical circuit will be formed.

10. An implement of the class described comprising a body having relatively separable parts including a cover, the body proper and said cover having recesses arranged to register with each other and complementary to form an electrode receiving pocket, electrical conductors terminating in said body, an electrode having its terminal projecting laterally from its spring tang through the side of said body and rigidly engaged by said cover, and an electrode having its terminal projecting laterally from its spring tang through the side of said body in parallel relation to the first mentioned terminal but of greater extent and normally protruding beyond the end of said rigidly engaged terminal and mounted for axial movement by deflection of its spring tang in said pocket when forced against an electrically conductive object to bridge the gap between the free ends of said electrodes, the tangs of said electrodes being held in contact with the terminals of said electrical conductors by said cover.

ROBERT C. ANGELL.